United States Patent Office 3,520,620
Patented July 14, 1970

3,520,620
DIFFERENTIAL REFRACTOMETER
Arthur B. Broerman, Bartlesville, Okla., assignor to Phillips Petroleum Company, a corporation of Delaware
Filed Dec. 5, 1966, Ser. No. 599,147
Int. Cl. G01n 21/46
U.S. Cl. 356—131                        9 Claims

ABSTRACT OF THE DISCLOSURE

A differential refractometer with a refractometer cell having a cylindrical glass member with a glass prism fused thereto at an oblique angle and adjusting means with improved sensitivity.

Figure 1:
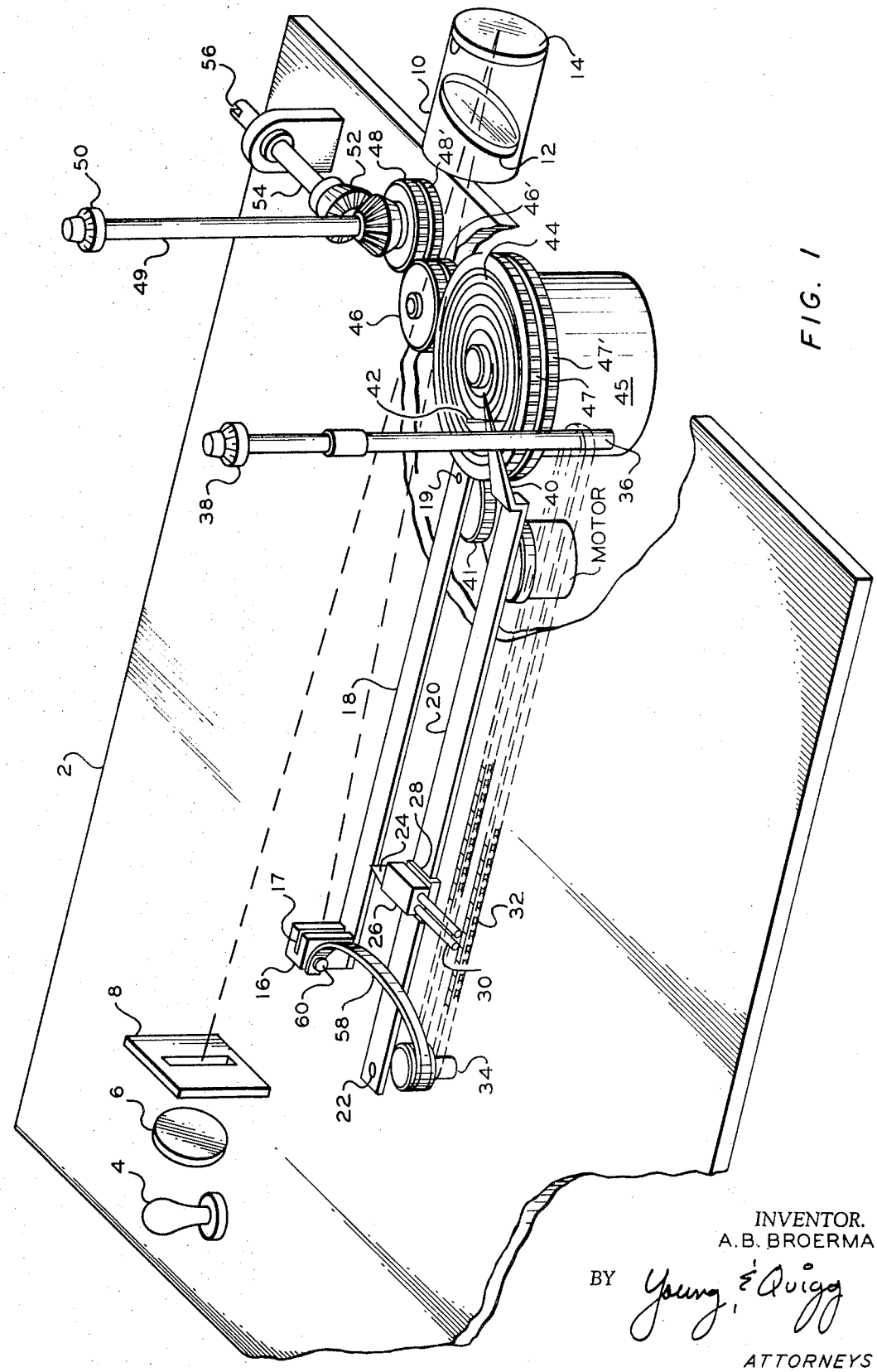

This invention relates to differential refractometers. In one of its aspects it relates to an instrument for measuring the refractive index of a fluid wherein a one-piece sample cell is provided. In another of its aspects, the invention relates to an instrument for measuring the refractive index of a fluid wherein the refraction of a light beam through a sample cell is detected by a photoelectric sensing means which is adjusted in accordance with the diffraction of the light beam by the sample fluid by means of a parallel arm adjusting means, the rate of change of an indicator means per change in the photoelectric sensing means being variable to accommodate a wide variety of fluids having a wide band of refractive indices.

In various chemical and petroleum operations it is a common practice to analyze a sample stream removed from some point in the process and to adjust an operating variable in response to the analysis to maintain desired conditions. One particular system of analysis that has proved to be useful involves measuring the refractive index of the sample stream. This measurement can advantageously be made by comparing the refractive index of the sample stream with the refractive index of a reference fluid. This is accomplished by directing a beam of radiation through a refractometer cell assembly and measuring the deviation of the emerging beam. The refractometer cell assembly is provided with two or more adjacent compartments which are separated by diagonal transparent plates. A reference fluid is positioned in one chamber and the sample fluid is circulated continuously through an adjacent chamber. An instrument of this type is generally referred to as a differential refractometer.

In measuring the refractive index of a hot sample stream which may or may not be under pressure, the construction of a sample cell is important. In prior sample cells, a cylindrical prismatic glass block was placed at an angle within a tubular housing to separate the sample side of the cell from the reference fluid side. This glass block was held in place by an O-ring. The angle which the light beam made with the cylindrical prismatic glass block was limited by the thickness of the prism since the O-ring was required to contact the prism on opposite sides all around the cell. This type of sample cell is shown in U.S. 2,857,803, Reinecke et al. This type of sampling cell while quite adequate for normal purposes is not strong enough to withstand pressures of some hot process streams and limits the angle which is used in measuring the refractive index of the sample streams.

I have now discovered that this sample cell can be improved by providing a thinner prism and fusing the same to the walls of a glass cylinder which can be positioned within the sample cell. By using the sample cell of the invention, a pressurized hot fluid stream can be sampled.

Many fluid streams can be sampled with a differential refractometer. However, the refractive index of some streams varies a great deal whereas the refractive index of other streams varies only slightly. With those streams in which the refractive index varies only slightly, it is necessary that the slight changes be sharply detected and compensation be made accordingly. On the other hand, with streams whose refractive index varies over a great range, it is necessary that the sensing means be adapted to accommodate the whole range. Oftentimes to adapt a refractometer to a different kind of process stream reqires a major modification to the refractometer system.

I have now discovered that a differential refractometer can be made to accommodate any number of process streams having a wide variation in refractive index properties by providing a simple parallel arm system whereby the sensing photoelectric means are positioned on one arm and an actuating means is positioned on another arm and there is provided an adjustable slide to vary the ratio of refractometer output per movemet of the photoelectric sensing means.

By various aspects of this invention, one or more of the following objects can be obtained.

It is an object of this invention to provide an improved sample cell for a differential refractometer.

It is a further object of this invention to provide a differential refractometer with an improved sensing means.

It is a further object of this invention to provide a differential refractometer with a means to easily adjust the amplification of the sensing device.

Other aspects, objects, and the several advantages of this invention are apparent to one skilled in the art from a study of this disclosure, the drawing and the appended claims.

According to the invention, there is provided, a differential refractometer for sampling hot process streams under pressure. The differential refractometer has a sample cell which comprises a tubular glass member having fused therein a glass prism at an angle to the axis of the cylindrical member. This combination of cylindrical tube and fused glass prism can be inserted and removed from the refractometer with ease. A plurality of these members can be used in sampling process streams having different refractive index properties.

Figure 2:
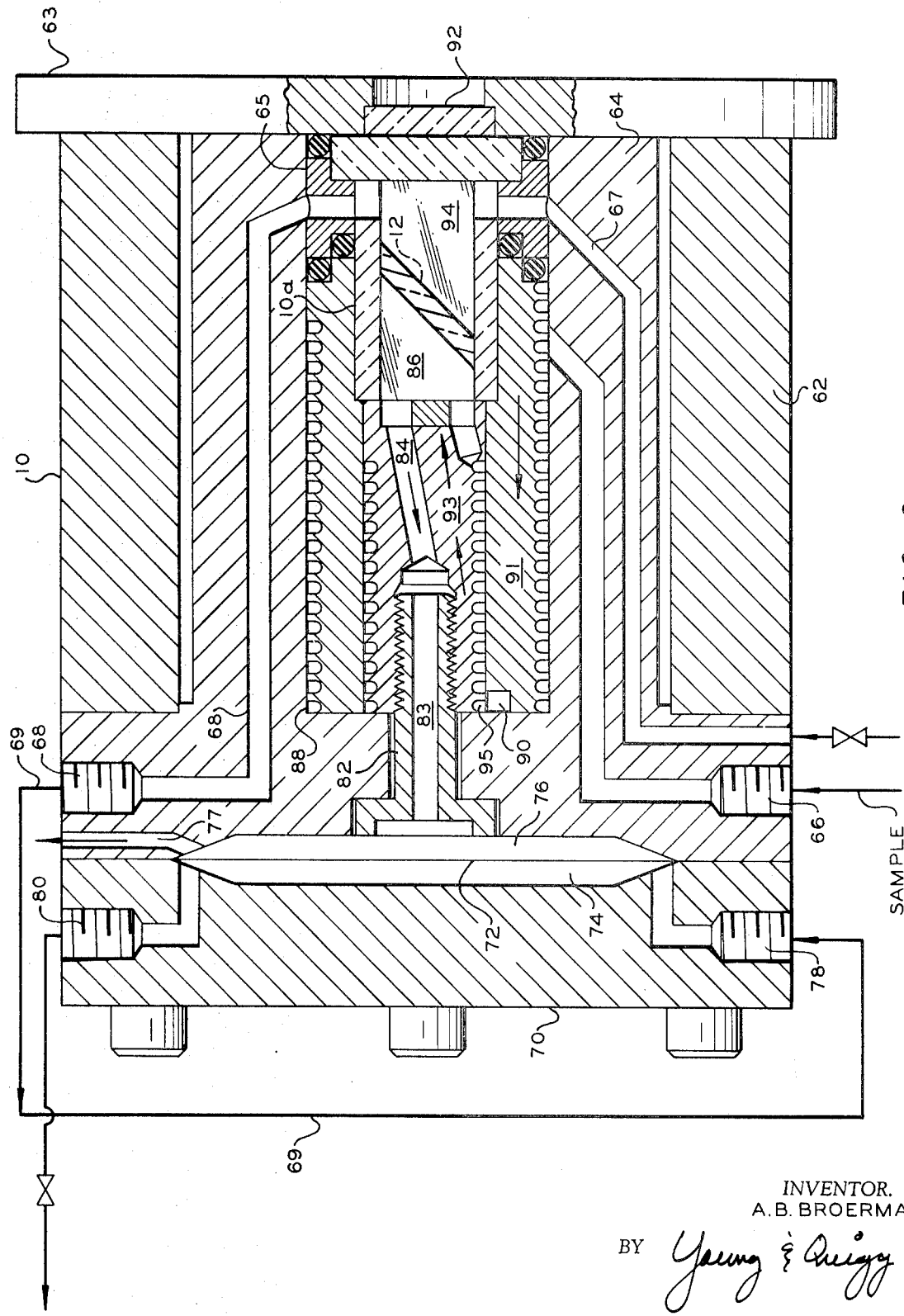

The invention will now be described with reference to the accompanying drawings in which FIG. 1 is a schematic view of a differential refractometer according to the invention and FIG. 2 is a sectional view through a sample cell according to the invention.

Referring now to FIG. 1, there is shown a base 2 having positioned thereon a lamp 4 which directs radiation through a condensing lens 6. The radiation transmitted through lens 6 passes through slit assembly 8 into refractometer cell assembly 10 which principally comprises a cylindrical tube having positioned therein a prism 12 at an angle to the axis of the cylindrical tube of assembly 10. The prism 12 separates a sample side of the cell from a standard side. The light is reflected by mirror 14 and passes to photoresistor assembly 16 which contains a pair of photoresistors (not shown). The photoresistor assembly 16 serves as a detection means to sense the extent of diffraction of the light beam passing through refractometer cell assembly 10. The light entering photoresistor assembly 16, when the instrument is in balance, is split into two beams by divider 17 so that the light impinges equally on each photoresistance element. The photoresistor assembly 16 is supported on arm 18 which is pivoted about point 19. Arm 20, pivotable about point 22, is substantially parallel to arm 18 and actuates the movement of arm 18 and, hence, photoresistor assembly 16 through magnetic contact 24 which is attached to block 26. A channel support 28 is attached to block 26 to allow block 26 to slide back and forth on arm 20. Block 26 is actuated to slide back and forth on arm 20 by chain drive 32 attached to shaft 34 at one end and to shaft 36 at the other end thereof. The shaft 36 has a dial indicator 38 attached to it to turn chain 32 to change the position of block 26 on arm 20. The chain 32 is attached to block 26 by rods 30 which extend through the chain. By this mechanism the amplitude of correction can be adjusted through dial indicator 38 while the refractometer is positioned within a closed housing.

Arm 20 is moved about point 22 by the movement of scroll 44 having a spiral groove therein. Pin 42 on member 40, attached to the end of arm 20, is positioned in the grooves in scroll 44 and thus will move back and forth in scroll 44 as an arm of a record played moves from the outside to the center of a record. Arm 18 is maintained in contact with magnetic contact 24 by a constant tension spring 58 attached in the photoresistor assembly 16 at 60 at one end and attached to rod 34 at the other end thereof. Scroll 44 is driven by a servomotor through gear 41 and gear 47' which is mounted on a shaft of a double ball bearing telemetering potentiometer encased in casing 45. Gear 47 fixed to the potentiometer shaft actuates by a friction clutch gear 47' in which scroll 44 is machined and drives gears 46' and 48'. A shaft 49 and indicator knob 50 are driven by gear 48'. A null zero adjustment is provided by bevel gear 52 which intermeshes with a bevel gear cluster 48 which rotates on but is not affixed to shaft 49, and by rods 54 and mechanical adjustment slot 56.

A null zero is set by positioning the desired sampling fluid and standard within the sample cell assembly 10, and setting and holding knob 50 at the desired position. Slot 56 is then turned to rotate shaft 54, bevel gear 52 and gear cluster 48, without rotating shaft 49, to turn gears 46, 47, containing scroll 44, thereby moving arm 20 and arm 18 until the light impinging on photoresistor cell assembly 16 falls equally on each photoresistor. Preventing the rotation of knob 50 will prevent rotation of gear 47' and thus prevent any change in the potentiometer setting.

The refractometer can be simply adjusted to provide for different fluids having different refractive properties by changing the ratio of movement of photoresistor assembly 16 with respect to the rotation of shaft 49. This can be done by turning knob 38 to move block 26 one direction or the other on arm 20. The movement of block 26 to the right as shown in FIG. 1 would cause more movement of assembly 16 per movement of pin 42 within scroll 44. Thus, any rotation of scroll 44 one turn, for example, would cause more of a response in assembly 16 when block 26 is shifted to the right. The movement of block 26 to the left as shown in FIG. 1 would cause less of a response of assembly 16 per rotation of scroll 44. This adjustment feature is especially useful when the refractometer assembly is positioned within a closed housing with indicator 38 on the outside.

In operation, when the sample within assembly 10 changes composition, the refractive character of the fluid will change and cause the light to impinge more on one photoresistor than on the other within assembly 16. This change will cause a change in a balance circuit (not shown) which will cause motor 45 to rotate scroll 44 in one direction or the other to correct for the unbalance. The rotation of scroll 44 will cause pin 42 to move toward the center or away from the center, thereby moving arm 20 and correspondingly arm 18. The amount of movement required is indicated on dial 50. A telemetering potentiometer signals a controller to change the composition of the sample fluid responsive to the indication on dial 50.

Referring now in detail to FIG. 2, the sample cell assembly has cylindrical glass tube 10a and fused therein a prismatic element 12. Preferably, the tube 10a and the prism 12 are made of high-temperature glass, such as Pyrex. The fusing is accomplished by heating the prism 12 in the tube 10a until melting temperature of each is reached and then slowly cooling the fused parts. The fusion of the prism to the tube 10a allows a greater angle to be used between the plane of the prism and the axis of the tube than would normally be possible with the use of an O-ring. In this manner, the area of refraction within the cell can be varied by inserting different tubes and prisms in the assembly depending on the kind of fluid to be sampled. The prism divides the cell into a sample side 86 and a standard side 94. Cylindrical tube 10a is surrounded by annular member 65 and tubular member 91 having a plurality of helical grooves 88 in the outside thereof. A port 90 communicates with helical grooves 95 in the outer portion of member 93. The fluid within sample chamber 86 communicates through port 84 and port 83 in member 82 with chamber 76 of a pressure equalizer having diaphragm 72. The other side of the pressure equalizer, side 74, communicates with the sample side 94 to equalize the pressure between chambers 86 and 94 of the sample cell. End plate 63 is connected to annular housing 62 and member 64 to house the sample cell. Lens 92 is also attached in plate 63 and holds the sample cell in place.

In operation, a standard is introduced through line 67 into chamber 94 and is passed therethrough to purge out any gas or air bubbles. The standard leaves chamber 94 through line 68 and passes through line 69 to port 78 and connecting block 70. The standard fluid then passes into chamber 74 of the pressure equalizer and out through port 80. After all of the gaseous materials have been purged from chamber 94, the line attached to port 80 is closed off, and the standard is locked within chamber 94 and in side 74 of the pressure equalizer. Sample is passed into port 66 to helical conduits 88 going from right to left as shown in FIG. 2 and passes through port 90 into helical port 95 going from left to right as shown in FIG. 2 and into the sample chamber 86 within tube 10a. The sample fluid then passes through line 84, line 83 to side 76 of the pressure equalizer and out through ports 77.

The use of the helical grooves in members 91 and 93 allows the temperature to be equalized between the sample fluid and the sample cell, including the standard. The use of the fused glass sample cylinder in combination with the pressure equalizing means allows the refractometer to be used under high pressures. The particular construction of the sample cell prevents the blow-out of lens 92 and sample cell 10, for example, under high pressures.

Reasonable variation and modification are possible within the scope of the foregoing disclosure, the drawings, and the claims to the invention without departing from the spirit thereof.

I claim:
1. A differential refractometer comprising:
 (a) a light source,
 (b) a refractometer cell adapted to receive light from a light source, said refractometer cell comprising a cylindrical tubular member made out of glass, said tubular member being divided into two sections by a glass prism fused therein inclined at an oblique angle to a longitudinal axis of said cylindrical member, said light from said light source passing generally along said axis of said cylindrical member,
 (c) a detection means having a movable photoresistor sensing means to sense diffraction of light being passed to said refractometer cell and means to adjust said photoresistor sensing means responsive to light which has been refracted by passing through said refractometer cell,
 (d) a first arm supporting said photocell sensing means at one end and is pivoted at a second end,
 (e) a second arm substantially parallel to said first arm and pivoted about an end nearest said photocell sensing means,
 (f) a disc having a spiral track thereon, a follower on said track, said follower attached to said second arm at a second end, and a means to rotate said spiral track about its center responsive to said light detected by said detection means, (g) means to maintain said second arm substantially parallel to said first arm, and (h) an indicator means for indicating the index of refraction of said fluid of said cell responsive to said adjustment of said photoresistor sensing means.

2. A differential refractometer according to claim 1 wherein there is provided a reflection means at one end of said refractometer cell to reflect light beams from said light source entering at an opposite end from said one end back through said refractometer cell.

3. A differential refractometer according to claim 1 wherein the pivot point of said first arm is in the vicinity of said spiral track.

4. A differential refractometer according to claim 1 wherein said means to maintain said second arm substantially parallel to said first arm comprises a magnetic means attached to said second arm and extending to said first arm to hold said first arm in contact with said second arm, said first arm having at least a portion thereof magnetic and a biasing means for maintaining constant tension, said biasing means attached between said first arm and said second arm.

5. A differential refractometer according to claim 4 wherein said magnetic means is slidably attached to said second arm.

6. A differential refractometer according to claim 4 wherein said biasing means is adjacent said pivoted end of said second arm and attached at one end of said first arm.

7. A differential refractometer according to claim 1 wherein said cylindrical tubular member and said fused glass prism are made from high-temperature resistant glass.

8. A differential refractometer, as set forth in claim 1, including a housing covering the refractometer with means for adjusting the photoresistor means extending through said housing.

9. A differential refractometer, as set forth in claim 1, wherein the photoresistor means is moved relative to the light source by the means to move said second arm responsive to said refractive light.

References Cited

UNITED STATES PATENTS

| | | | |
|---|---|---|---|
| 2,857,803 | 10/1958 | Reinecke et al. | 356—131 X |
| 2,933,974 | 4/1960 | Broerman | 356—131 |
| 3,013,465 | 12/1961 | Collyer | 356—131 |
| 3,051,037 | 8/1962 | Broerman | 356—131 |
| 3,124,148 | 3/1964 | Kleiss et al. | 356—131 X |

RONALD L. WIBERT, Primary Examiner

T. MAJOR, Assistant Examiner